(12) United States Patent
Starbuck et al.

(10) Patent No.: US 7,342,555 B2
(45) Date of Patent: Mar. 11, 2008

(54) DETECTING LOW FIDELITY SYNC DATA

(75) Inventors: Bryan T. Starbuck, Redmond, WA (US); David R. Potter, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 726 days.

(21) Appl. No.: 10/835,900

(22) Filed: Apr. 30, 2004

(65) Prior Publication Data
US 2006/0028396 A1    Feb. 9, 2006

(51) Int. Cl.
G09G 5/00        (2006.01)
G06F 15/16       (2006.01)
G06F 17/30       (2006.01)

(52) U.S. Cl. .................. 345/2.3; 345/1.1; 345/2.1; 709/217; 709/219; 709/248; 707/200; 707/201

(58) Field of Classification Search .......... 345/1.1, 345/2.1, 2.3, 169; 709/217, 218, 219, 248; 707/1, 3, 200, 201; 713/400
See application file for complete search history.

(56) References Cited

U.S. PATENT DOCUMENTS

| | | | |
|---|---|---|---|
| 6,052,735 A | 4/2000 | Ulrich et al. | 709/236 |
| 6,324,544 B1 | 11/2001 | Alam et al. | 707/201 |
| 6,442,570 B1 | 8/2002 | Wu | 707/201 |
| 6,463,427 B1 | 10/2002 | Wu | 707/3 |
| 6,505,214 B1 | 1/2003 | Sherman et al. | 707/201 |
| 6,944,636 B1 * | 9/2005 | Starbuck | 707/203 |
| 6,950,835 B1 * | 9/2005 | Starbuck | 707/203 |
| 7,216,134 B2 * | 5/2007 | Starbuck | 707/203 |
| 7,284,021 B2 * | 10/2007 | Starbuck | 707/203 |
| 2003/0005342 A1 | 1/2003 | Thomas et al. | 713/400 |
| 2003/0046434 A1 | 3/2003 | Flanagin et al. | 709/248 |

OTHER PUBLICATIONS

Ming Xiong, et al., "MIRROR: A State-Conscious Concurrency Control Protocol for Replicated Real-Time Databases," Information Systems, vol. 27, Issue 4, Jun. 2002, pp. 277-297.
Bhalla, S., "The Performance of an Effective Distributed Synchronization and Recovery Algorithm," Journal of Supercomputing, vol. 19, Issue 2, Jun. 2001, pp. 199-219.
Son, S.H., et al., "A Token-Based Synchronization Scheme for Distributed Real-Time Databases," Information Systems, vol. 18, Issue 6, Sep. 1993, pp. 375-389.
Sinah, M.K., "Commutable Transactions and the Time-Pad Synchronization Mechanism for Distributed Systems," IEEE Transactions on Software Engineering, vol. SE-12, Issue 3, Mar. 1986, pp. 462-476.

* cited by examiner

*Primary Examiner*—My-Chau T. Tran
(74) *Attorney, Agent, or Firm*—Workman Nydegger (57) ABSTRACT

The present invention provides for a distributed computing system that is capable of determining when data needs to be synced between two computer devices because data has changed on at least a remote device. More particularly, the present invention provides for a sync adapter that uses sync data to detect that a property on a device is new and needs to synchronize with corresponding data on another machine. The sync data is specific to the two devices in that the sync data mirrors data that was last synchronized between these two computing devices. Other example embodiments use the sync data to detect and mark data as low fidelity data for identifying any date and time information associated with the low fidelity data as potentially unreliable.

14 Claims, 6 Drawing Sheets

DETECTING LOW FIDELITY SYNC DATA

CROSS-REFERENCE TO RELATED APPLICATIONS

N/A

BACKGROUND OF THE INVENTION

1. The Field of the Invention

The present invention generally relates to synchronizing data within a distributed computer system. More particularly, the present invention provides for an improved system for detecting when data has changed on a device and for detecting low fidelity sync data.

2. Background and Related Art

Laptop, handheld, and other portable computers or computing devices have increased in popularity as the devices become smaller in size and less expensive. Additionally, improved operating speed and processing power of portable computers has increased their popularity. Many portable computers are capable of storing multiple application programs, such as address books, games, calculators, and the like. The application programs can be permanently installed in the portable computer during manufacture (e.g., on Read-Only Memory (ROM)). Alternatively, one or more application programs may be installed by the user after purchasing the portable computer.

With the increased popularity and computing power of such devices, people are beginning to store data and applications using more than just a single computing device. Many people, for example, often use laptop computers in addition to their regular desktop computer. Other devices such as cellular telephones, Personal Digital Assistance (PDAs), Internet services, and the like are also used for storing data and applications.

Each of these computing devices may be part of a distributed computing system wherein related information can be correlated and stored on multiple such devices. For example, a user may have a digital address book stored on their desktop work computer, on their PDA, on their mobile phone, on an Internet service, etc. Accordingly, while at work, it may be convenient for the user to access contact information, which may include phone numbers and other general contact information. While away from work, however, the user may be able to use the address book in a mobile form such as a personal digital assistance (PDA) or other mobile information storage system. Ideally, the contact information of the PDA should match the contact information at the desktop work computer.

When the same or related information is stored in two places, it is possible for the data to change in one location and not in the other. This problem may be overcome through synchronization, which is an automated process that attempts to ensure that each device within the distributed system has the most current information or data. Synchronization, however, has its own set of problems. For example, when synchronization is initialized between the two devices, current systems detect changed property values by comparing corresponding property values from each device. Such comparison, however, gives no indication as to which device made the change. As such, when a property change has occurred on either device, a conflict occurs and a conflict resolution process must be performed.

Other systems mark a changed property with a tag indicating that a change has occurred, e.g., "change," "delete," "add," or other tag, as appropriate. In such systems, however, each device within the distributed computing system must have the ability to tag a property when it has changed. Many legacy devices, however, don't have such capabilities, and therefore conflicts will still result and need to be reconciled.

Typically, conflicts can be resolved through comparing metadata associated with the property values that give, e.g., time-date information. The latest time-date information is considered the most up-to-date information and the properties can be updated accordingly. Alternatively, a user interface (UI) can be presented to the user in order to resolve the conflict.

In any event, having to resolve the conflict consumes processing resources and is particularly problematic when the data to be synchronized does not include time-date information, which is referred to as low fidelity data. For example, many smaller computing devices have limited physical resources and are incapable of maintaining time-date information for properties of a data structure item. As such, when a computer syncs data in from such low fidelity device, it doesn't know when the user originally set that property. This prevents the computer from syncing in a property from another computing device and confidently using "last-writer-wins" resolution logic to pick the most up-to-date property. Further, even if no conflict existed, there is typically no way to sync the property change to the receiving device without a conflict resolution process. In addition, even if the low fidelity data could be synced, there would be no way to indicate to other devices that the data was received from a low fidelity source.

BRIEF SUMMARY OF THE INVENTION

The above-identified deficiencies and drawbacks of current synchronization systems are overcome by the present invention. For example, exemplary embodiments provide for improved systems, methods, and computer program products for determining when data needs to be synchronized between two computer devices. For example, when data has changed on a remote device within a distributed computing system. Further, the present invention provides for detecting and marking data as low fidelity data such that any time-date information associated with the low fidelity data can be identified as potentially unreliable Example embodiments provide that when synchronization is initialized between a local machine and a remote device, the local machine may receive remote data that includes properties that have changed on the remote device since the properties were last synchronized between the local machine and the remote device. Sync data may be accessed, which is specific to the local machine and the remote device in that the sync data mirrors data that was last synchronized between the local machine and remote device. A portion of the sync data may be compared with a corresponding portion of the remote data, and based on the comparison an indication that the properties need to be synced down to the local machine is provided.

Other example embodiments provide for detecting and marking data as low fidelity data such that any time-date information associated with the low fidelity data can be identified as potentially unreliable. When synchronization of data between a local machine and a remote machine is initialized it may be determined that one or more properties of remote device are changed properties that need to be synchronized with corresponding properties of local data. It may also be established that the change properties are low fidelity data in that it is not determinative when the one or more properties where changed. Upon synchronization of the change properties, the one or more properties may be marked as low fidelity data.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for determining when data needs to be synchronized between two computing devices and identifying and marking low fidelity data. The embodiments of the present invention may comprise a special purpose or general-purpose computer including various computer hardware, as discussed in greater detail below.

The present invention provides for a distributed computing system that is capable of determining when data needs to be synced between two computer devices because data has changed on at least a remote device. More particularly, the present invention provides for a sync adapter that uses sync data to detect that a property on a device is new and needs to synchronize with corresponding data on another machine. The sync data is specific to the two devices in that the sync data mirrors data that was last synchronized between these two computing devices. Other example embodiments use the sync data to detect and mark data as low fidelity data such that any date and time information associated with the low fidelity data is considered unreliable.

Reference will now be made to the figures wherein like structures will be provided with like or similar reference designations. It is understood that the drawings are examples of schematic representations of embodiments of the invention, and are not meant to limit or otherwise narrow the scope of the present invention.

Figure 1A:
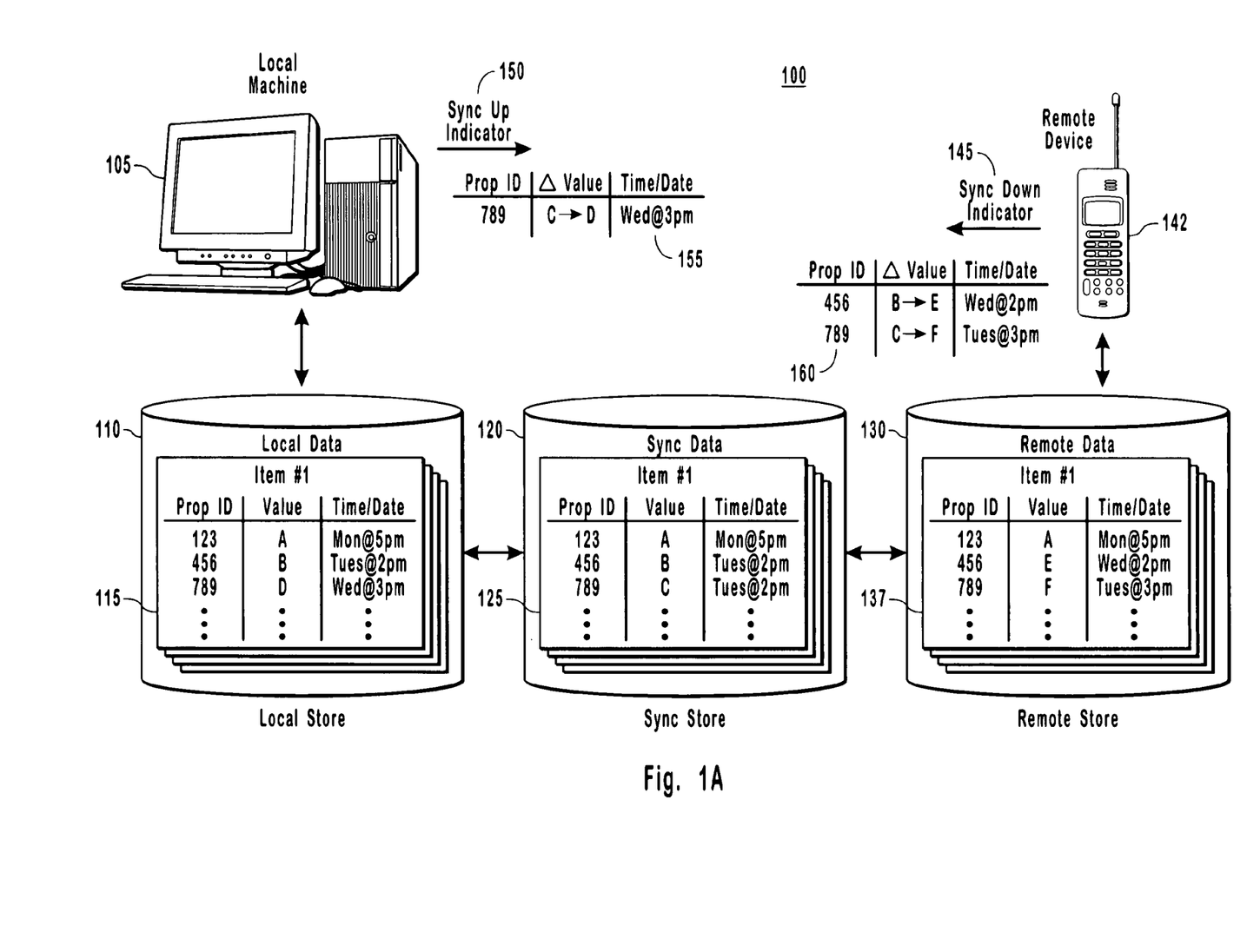
FIG. 1A illustrates the synchronization of two high fidelity computer devices in accordance with example embodiments of the present invention.

FIG. 1A illustrates the use of sync data for indicating when data needs to be synchronized between a local machine 105 and a remote device 142. A distributed system 100 is provided wherein local machine 105 and remote device 142 are initially set to synchronize. In this illustration, the local machine 105 and the remote device 142 are high fidelity devices in that the databases for each are capable of storing time-date information for each property associated within an item. As shown in FIG. 1A, local machine 105 has a local store 110 which has local data 115 corresponding to various items of information. Local data 115 may be, e.g., contact information wherein each item would correspond to information about an individual person, company, corporation, or any other similar contact. An example of the properties associated with contact information may be first name, middle name, last name, address, phone number, email address, website information, etc. As one would recognize, however, the local data 115 may be information other than contact information. For example, the local data could be calendar and scheduling information, a file, an application or any other such information needing to be synced between two devices. Accordingly, reference to contact information is used for illustrative purposes only and is not meant to limit or otherwise narrow the scope of the present invention except where explicitly claimed.

Similar to local machine's 105's local store 110, remote device 142 also includes a remote store 130 with remote data 137 including items and properties that correspond to those in local data 115. As previously mentioned, both local machine 105 and remote device 142 are considered high fidelity devices in that the local stores 110 is capable of storing time-date information within each item and for each property.

In accordance with example embodiments, a sync store 120 is also provided with sync data 125. A sync adapter (not shown) uses the sync data 125 to detect that a property on a device is new or changed and needs to synchronize. The sync data 125 is specific to local machine 105 and remote device 142 in that the sync data mirrors data that was last synchronized between the local machine 105 and the remote device 142. In other words, sync data 125 holds state information for the property values as they were last updated between local machine 105 and remote device 142.

Example embodiments provide that when property values are synchronized between local machine 105 and remote device 142 the sync adapter compares the remote data 137 and/or local data 115 to the sync data 125 in order to determine which properties need to be either synced down 145 or synced up 150, as appropriate. For example, as illustrated in FIG. 1A, a user (not shown) of local machine 105 has changed property identity (Prop. ID) 789 from C to D on Wednesday at 3:00 p.m. Upon synchronization between local machine 105 and remote device 142, the sync adapter will compare local data 115 with sync data 125 to determine that the above change was made. As such, sync adapter applies sync up indicator 150 to the property identity 789 indicating that a change in the property 789 needs to be synced up to the remote device 142. As shown in changed table 155, this suggests property 789 has a delta or change in value of C to D with a time-date of Wednesday at 3:00 p.m.

It should be noted that although the previous and foregoing discussion regarding FIGS. 1A-D rely on day of the week and time of day for time-date information, other similar information is also available. For example, the year, month, day of the month (e.g., Apr. 29, 2004), and other time-date information can be used in the present invention. Accordingly, the use of the day of the week and time of day in the discussion of FIGS. 1A-D is for illustrative purposes only and is not meant to limit or otherwise narrow the scope of the present invention. Further, it is noted that the comparison of local data 115 (as well as remote data 137) with sync data 125 to determine if a change has been made can be done using several different values for comparison. For example, comparison of the property values can be made to determine if a change has been made. Alternatively, or in conjunction, comparison of time-date information can be made, wherein if time data information doesn't match it can be determined that a change has been made. Further, comparison of hashes or other representations of the data can be used to determine if properties have changed. Accordingly, for purposes of the present invention, any discussion of the comparison of data for determining if changes have been made and properties need to be synced should be broadly interpreted to encompass comparing any portion or representation of the data.

Similar to local machine 105, a user of remote device 142 has made changes to property values for properties 456 and 789. Accordingly, sync adapter will compare remote data 137 with sync data 125 in order to determine those property values that have changed. In general, when a change has occurred, a sync down indicator 145 will be applied against each property identity that has changed. For instance as shown in table 160, property 456 has a delta value of B to E with a time-date of Wednesday at 2:00 p.m. Further, property 789 has a delta value of C to F on Tuesday at 3:00 p.m. As such, sync down indicators 145 will be applied against these properties indicating that such changes need to be synced down to local machine 105.

Example embodiments provide sync store 120 may reside on local machine 105. As one would appreciate, however, sync store may be a database that is outside local machine, but easily accessible to the sync adapter of local machine 105. In any event, local machine 105 can download the remote data 137 from remote store 130 when comparing sync data 125 to the remote data 137. This has the added benefit of preserving the limited resources of the remote device 142, e.g., when the remote device 142 is a low fidelity device, as in a later example.

Next, a comparison of sync up indicators 150 and sync down indicators 145 can be made for each property to determine if conflicts exist. For example, because there is no corresponding sync up indicator for property 456, it can be determined that property 456 needing to be synced down from remote device 142 has no conflict. As such, the local data 115 and the sync data 125 can be updated in accordance with the changes made, i.e., property 456 for local 115 and sync data 125 will be updated to have a value of E and time-date information of Wednesday at 2 p.m. (as shown in FIG. 1D).

Sync adapter can also use sync indicators 150, 145 to identify conflicts between properties. For example, as shown in FIG. 1A, it was determined that property 789 had a change in property value for both the local machine 105 and remote device 142. As such, there is both sync up 150 and sync down 145 indicators for property 789, and conflict exists between what value should be synced for updating property data. When local machine 105 and remote device 142 are high fidelity devices, as in this case, the conflict may easily be resolved by a comparison of time-date information. For example, as shown in tables 155 and 160, a user of local machine 105 changed the 789 property value from C to D on Wednesday at 3:00 p.m., whereas a user of remote device 142 changed the 789 property value from C to F on Tuesday at 3:00 p.m. Using a "last-writer-wins" rule (which means that the most recently updated information should be written), the property value for local machine 105 wins since it has the most currently updated value. Therefore, the value D for property 789 should be synced up to remote device 142 and the corresponding remote data 137 and property identity 789 within remote data 137 should be updated with the appropriate D value. In addition, the time-date information of Wednesday at 3 p.m. should also be updated for property 789 in remote data 137.

Conflict resolutions (as the one outlined above with regard to FIG. 1) are more problematic when the data to be synced from one or more of the devices does not contain time-date information, which is referred to as low fidelity data. For example, low fidelity devices, i.e., a device whose database is not capable of storing time-date information for properties. Such devices can be legacy devices, however, there is no restriction on the source of low fidelity data. For example, time-date information from a high fidelity device may be lost or corrupted. Further, a high fidelity device may have synced data down from a low fidelity and subsequently synced that same data with another high fidelity device. Accordingly, the use of the term low fidelity data is meant to be construed broadly to cover any data wherein the time-date information is either excluded or potentially unreliable.

Figure 1B:
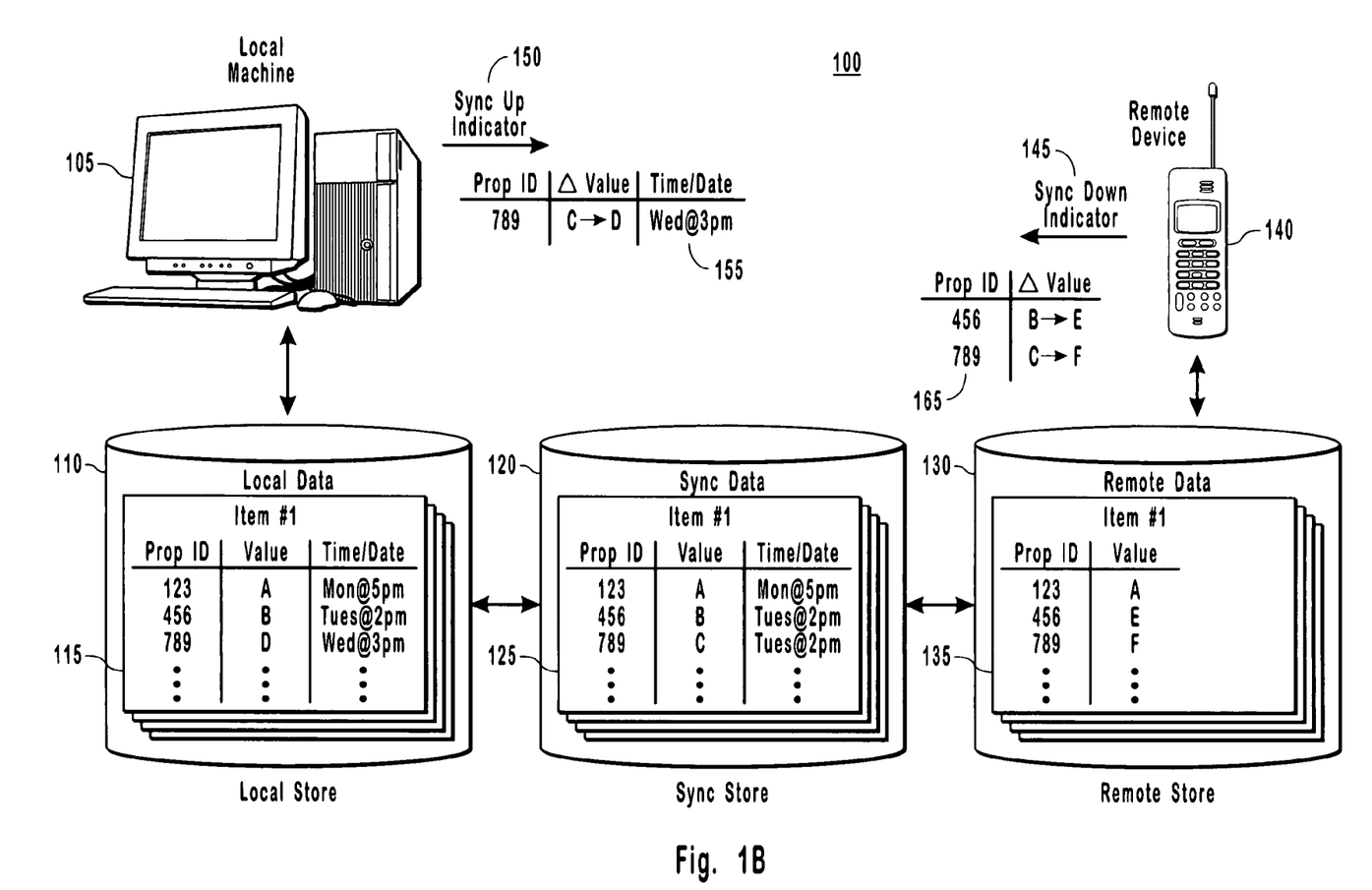
FIG. 1B illustrates the initial synchronization of one high fidelity device and one low fidelity device in accordance with example embodiments of the present invention.

As shown in FIG. 1B, a distributed system 100 is provided that includes local machine 105 and remote device 140, wherein local machine 105 is a high fidelity device and remote device 140 is a low fidelity device. With similar techniques as those described above regarding FIG. 1A, a sync adapter can compare local data 115 and sync data 125, as well as remote data 135 and sync data 125, to determine which properties have changed. In doing such comparisons in the present instance, sync adapter can note that property 789 had a delta value of C to D on Wednesday at 3:00 p.m., and can use a sync up indicator 150 to indicate such. Similarly, using the sync data 125, a sync adapter can identify property 456 and property 789 as also having changed on remote device 140. Accordingly, sync down indicators 145 can be associated with the property ID's 456 and 789 in order to indicate that such information should be synced down to local machine 105.

Unlike the present invention, typical sync systems cannot determine whether low fidelity data properties need to be synced up or down. For example, assuming a property value has changed on the local machine 105 and the remote device 140 has a different value for the same corresponding property ID. A sync adapter would not know if: (1) the property value at the remote device 140 has always been there (i.e., has not changed since the last synchronization), and therefore does not need to be synced down; or (2) the value at the remote device 140 has changed since the last sync and does need to be synced down.

In order to resolve the above problem for syncing low fidelity data, the present invention provides for using sync data 125 to detect whether data on a remote device has been changed or not, and therefore whether or not such change in property value needs to be synced down. In other words, since the sync data 125 mirrors the state of the last sync data, it can be compared with the newest remote data 135 on remote device 140 for determining if the properties have changed or not. As previously mentioned, the same process is also used to detect which properties have changed on local machine 105 by comparing sync date data 125 properties against local data properties 115.

Figure 1C:
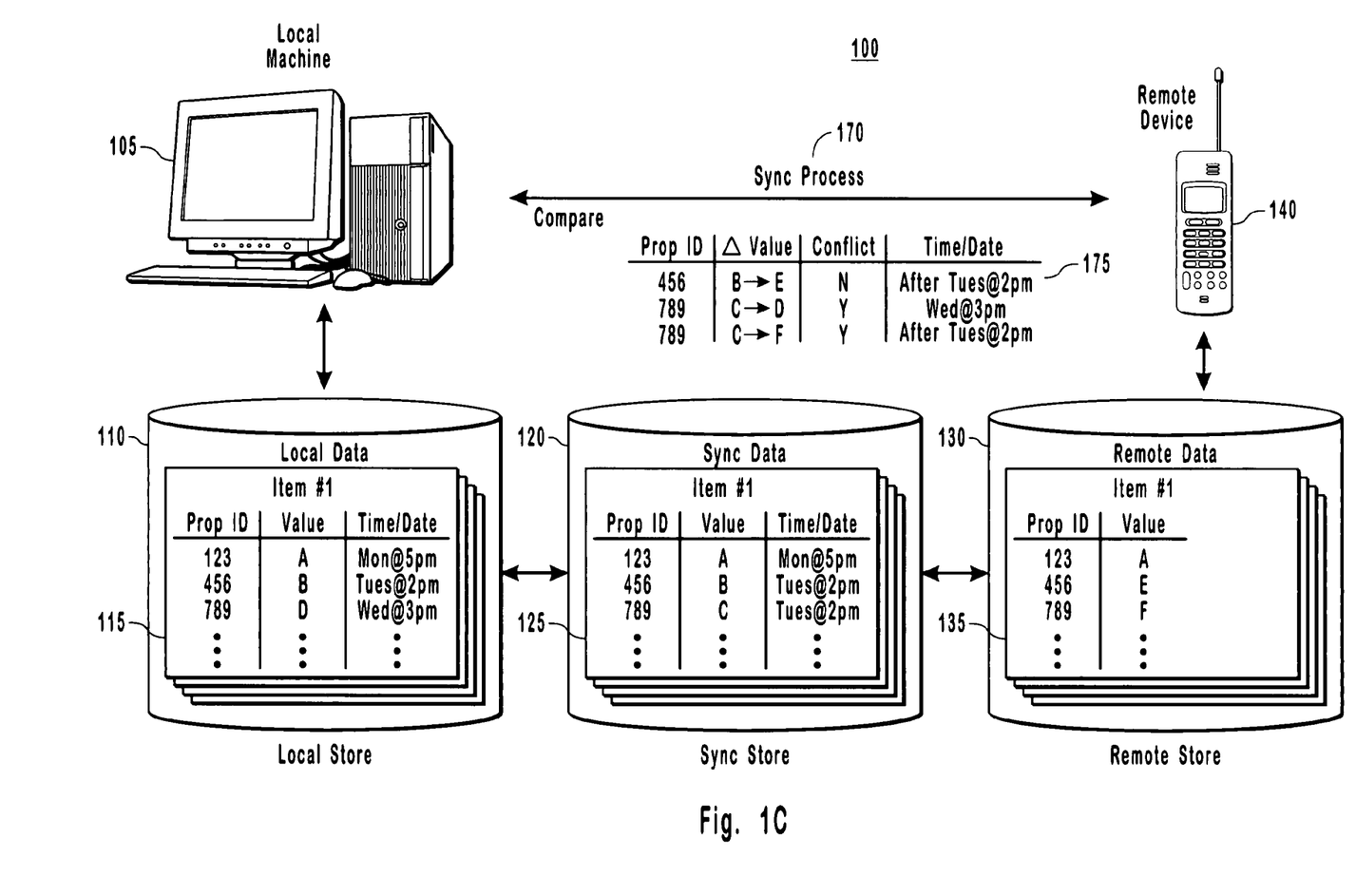
FIG. 1C illustrates the conflict identification during a sync process where one device is a low fidelity device in accordance with example embodiments of the present invention.
Figure 1D:
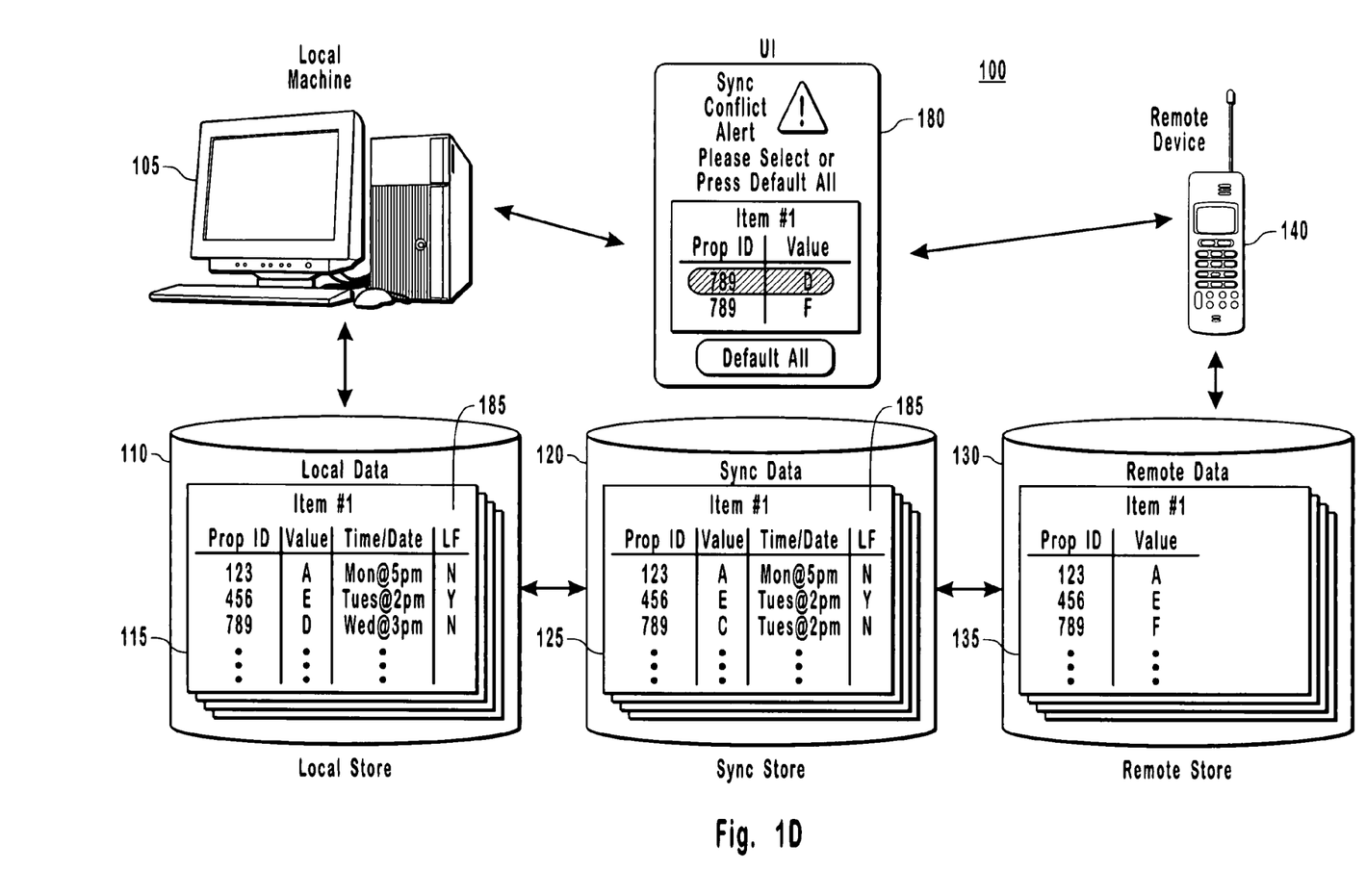
FIG. 1D illustrates the use of a user interface in order to resolve conflicts established in accordance with example embodiments of the present invention.

FIG. 1C illustrates a distributed system 100 with local machine 105 and remote device 140 wherein sync adapter can implement sync process 170. Accordingly as shown in table 175, sync process 170 will compare properties of items that have sync down 145 and sync up 150 indicators. For example, similar to the process described above regarding FIG. 1A, because there is no corresponding sync up indicator 150 for property 456 (with a delta value of B to E and no time data information), there is no conflict and property 456 with a value of E can be written locally within local data 115 and sync data 125.

Since remote device 140 is low fidelity, no time data information is provided to update local data 115 and sync data 125. Example embodiments, however, allow for time-date information to be approximated and assigned to the property. For example, because the changed property must have been modified at some time after the last sync, the time-date information assigned to the changed property may be based on information currently provided in the local data 115 or sync data 125. For instance, as shown in local data 115 and sync data 125, property 456 was previously changed on Tuesday at 2:00 p.m., which also reflects the most current time-date information associated with property 456 in sync data 125, since it would have otherwise been updated on the last sync if it had changed. Accordingly, this time-date information may be used to approximate time-date information for the low fidelity data property 456.

Alternatively, example embodiments provided for knowing when the last sync occurred (as opposed to when the property was last modified by a user), and can use that information to approximate time-date information for low fidelity data property 456. For example, sync adapter can indicate when the last sync was performed between the two devices and put the appropriate time-date information within the sync data 125. Because any change to data must have occurred after the last sync, this time-date information can be used in determining an approximation for when the properties changed. In any event, as will be described in greater detail below, the time-date information approximated and assigned to the low fidelity data or property should be identified to other high fidelity devices as low fidelity data and therefore potentially unreliable for resolving conflicts.

It should be noted that unlike property change for 456, property 789 does have a conflict, which cannot be resolved using the time-date approximation for low fidelity data described above. This is because the time-date approximation is only accurate for time up-until the last time-date information provided (i.e., the last time the property was modified or the last time the property was synced). As such, any conflict would indicate that data changed after this time, and therefore such time-date approximation cannot be used to resolve a conflict with any degree of accuracy.

In order to resolve such conflict, other example embodiments may be implemented. For instance, as shown in FIG. 1D, exemplary embodiments provide for a user interface 180 that can be presented to a user in order to resolve the conflict for property 789. The UI 180 may prompt to the user to select a value to update the remote data 135 or local data 115 and sync data 125. Example embodiments also provide for a default value which can be highlighted and selected based on, for instance, topology considerations, such as the value on local machine 105 always wins. The default value may also be chosen based on any other well known ways for arbitrarily choosing a value.

As previously mentioned, since any assignment of time-date information for low fidelity data is merely an approximation, such time-date is potentially unreliable. Accordingly, high fidelity sync adapters need to be aware of the degree of trust assigned time-date information associated with the low fidelity data property. Accordingly, example embodiments provide for detecting and marking data as low fidelity data such that any time-date information associated with the low fidelity data is deemed potentially unreliable. For example, as previously described, the sync adapter can use the sync data 125 to detect a property on a remote device 140 as new and needing to be synced down. If the property has not changed locally, then there is no conflict and the property may be written on local machine 105. If the sync adapter does not receive time-date information for the changed property (because it is low fidelity data), when the property is written into local data 115, a marking or tag can be made to indicate that the property value is associated with the low fidelity data. For example, as shown in FIG. 1D, a low fidelity flag field 185 may be used to indicate whether property data is Low Fidelity (LF). Such information may be included in both the local data 115, as well the sync data 125.

Alternatively, example embodiments provided for indicating that property data is low fidelity data by setting the assigned time-date information to a value slightly above the last known time-date information associated with the property or the last time the property was synced. For example, time-date information that is written onto local data 115 and sync data 125 may be adjusted by a few seconds above the existing time-date information for the property stored within the local data 115 and sync data 125. By way of example, property 456—which, as shown in sync data 125 and local data 115, was last modified by a user on Tuesday at 2 p.m.—may be assigned time-date information of Tuesday at 2:00:02 p.m. Sync adapter can then update both the local data 115 and the sync data 125 with the corresponding two second increment.

The above example embodiment of marking a property as low fidelity using a slight increment in time-date information provides several advantageous features. For example, a predetermined time increment having an increased likelihood of being less than an average approximate sync time can be used, e.g., one second. If any other sync adapter sees that the local time-date information is incrementally newer by this predetermined amount newer than the sync data 125 time-date information, then it can be deduced that the local property was synchronized in by another sync adapter that must have been low fidelity (since it is unlikely the data was synchronized across the distributed system). Although there is a slight chance that another high fidelity source made the change just a few seconds off, the probability is unlikely. In any case, it is a safe failback to this conclusion.

Regardless of whether time-date information is flagged as low fidelity data, or whether the time-date incrementally differs by a predetermined amount, such indication will let other synced adapters know the likelihood that the local time-date information can be trusted. A high fidelity sync adapter can use this to appropriately detect and trust properties that had been determined to originate from non-low fidelity sync adapters.

The present invention may also be described in terms of methods comprising functional steps and/or non-functional acts. Further, the use of these terms in the recitations of the claims and the following example flow charts are used to indicate the desired specific use of such terms.

Figure 2:
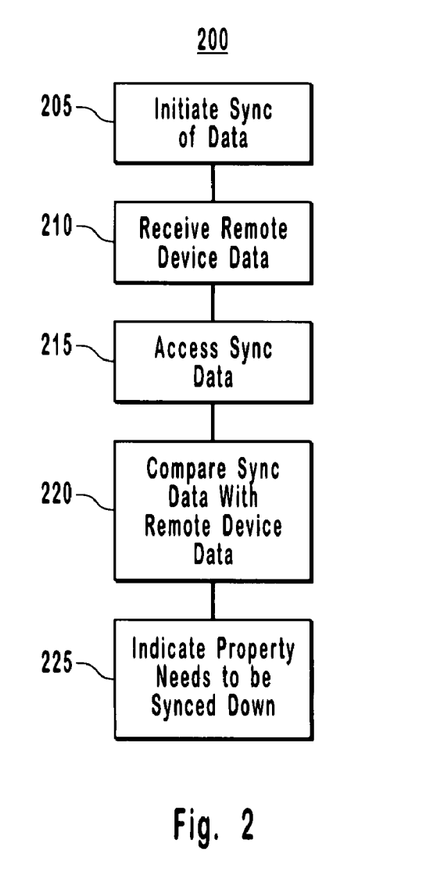
FIG. 2 illustrates an example flow chart of a method for synchronizing data between two computer devices in accordance with example embodiments.

FIG. 2 illustrates an example flow chart of a method 200 that includes acts for determining when data needs to be synchronized between two computer devices because data has changed on at least a remote device. The following description of FIG. 2, and FIG. 3, will occasionally refer to corresponding elements from FIGS. 1A-D. Although reference may be made to a specific element from FIGS. 1A-D, such elements are used for illustrative purposes only and are not meant to limit or otherwise narrow the scope of the present invention.

Method 200 may include an act of initiating 205 synchronization of data between local machine 105 and remote device 140. For example, local machine 105 may initiate a sync with remote device 140, 142. The initiation, however, may be made by either local machine 105 or remote device 140, 142. Further, method 200 includes an act of receiving 210 remote data 135. For example, local machine 105 can receive remote data 135, 137. The remote data 135, 137 may include one or more properties that have changed on the remote device 140, 142 since the remote properties were last synchronized between local machine 105 and remote device 140, 142.

The method 200 further provides for accessing 215 sync data. For example, local machine 105 can access sync data 125. Sync data 125 is specific to local machine 105 and remote device 140, 142 in that sync data 125 mirrors data that was last synchronized between the local machine 105 and the remote device 140, 142. Method 200 further includes the act of comparing 220 sync data with remote data. For example, local machine 105 can compare sync data 125 with remote data 135, 137. The comparison of data may be for a portion of the sync data 125 and the corresponding portion of the remote data 135, 137. For example, comparison may be of just the property values, the time-date information, a hash of the properties, or other representation of the data, in order to indicate that data has changed since the last synchronization.

Method 200 also includes an act of indicating 225 that the property needs to be synced down. For example, sync adapter can indicate that property 456, 789 needs to be synced down. Such sync down indication 145 is based on the comparison of a portion of the sync data 125 with a portion of the remote data 135.

As previously mentioned, other example embodiments provide that the local data 115 can be compared with the sync data 125 in order to determine those properties that need to be synced up to remote device 140, 142. Accordingly, the present invention provides for accessing local data 115 that includes local properties that have changed on the local machine 105 since the local properties were last synchronized between the local machine 105 and remote device 140. A comparison of a portion of the sync data 125 with the corresponding portion of local data 115 is also provided. Based on the comparison, an indication (such as sync up indicator 150) is provided that the local properties need to be synced up to the remote device 140, 142.

When both the local machine 105 and remote device 142 are high fidelity devices, the present invention also provides for determining that the remote properties conflict with local properties. An evaluation of local and remote metadata included in the remote data 137 and local data 115, respectively, may then be made. The metadata may indicate when one or more users made changes to the remote and local properties, such as time-date information. Based on the evaluation, the conflict can be resolved by choosing either the one or more remote properties or the one or more local properties. For example, the most recent time-date information may be chosen in order to resolve the conflict. As such based on the choice, one or more of the local data 115, remote data 137 or the sync data 125 should be updated.

When the local machine 105 is high fidelity and the remote device 140 is low fidelity, the present invention also provides for determining that the remote properties conflict with local properties. Based on a comparison of a portion of the sync data 125 and a portion of the remote data 135, it can be determined that the remote data 135 is low fidelity data. Accordingly, the conflict cannot be resolved based on when a user made changes to the remote properties. In such instance, a user interface may be presented to a user to allow the user to choose between the one or more remote properties and the one or more local properties in order to resolve the conflict. Alternatively, the conflict may be resolved by automatically choosing a value based on some predetermined criteria.

Still other embodiments provided if no conflicts exist, or if the conflicts are resolved appropriately, the corresponding properties within both the local data 115 and the sync data 125 should be changed in accordance with the changes made to the remote properties. Similarly, corresponding properties within both the remote device data 135 and sync data 125 should be changed in accordance with the changes made to the local properties. Further embodiments provide that based on the comparison of a portion of the sync data 125 and a portion of the remote data 135, 137 it can be determined that the remote properties are low fidelity data. Accordingly the local data 115 and sync data 125 can indicate that the changes made in accordance with the changes made to the remote properties are low fidelity data.

The remote data 135, 137 and the local data 115 may include information about a contact, wherein the properties would be information about the contact. The properties may be associated with an address, phone number, email address, or web page.

Figure 3:
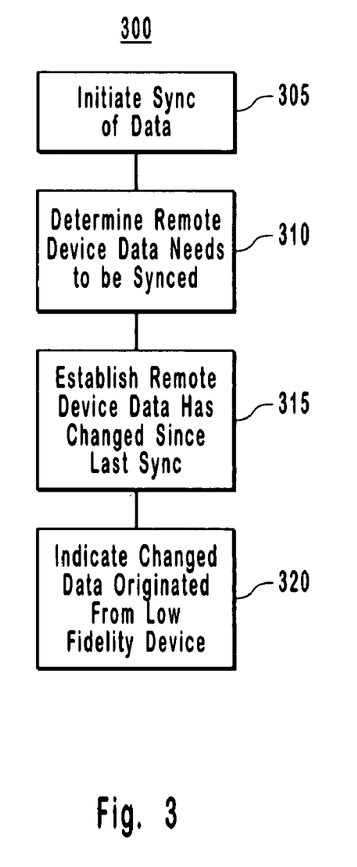
FIG. 3 illustrates a flow chart of a method for detecting and marking data as low fidelity data in accordance with example embodiments.

FIG. 3 illustrates an example flow chart of a method 300 of detecting and marking data as low fidelity for identifying any date and time information associated with the low fidelity data as potentially unreliable. Method 300 includes an act of initiating 305 synchronization of data. For example, local machine 105 can initiate synchronization between local machine 105 and a remote device 140. Method 300 also includes an act of determining 310 remote device data needs to be synced. For example, sync adapter can determine that remote data 135, 137 has changed properties that need to be synchronized with the corresponding properties of local data 115.

Method 300 also includes an act of establishing 315 that remote device data has changed since the last sync. For example, local machine 105 can determine that remote data 135, 137 has changed since the last sync between the local machine 105 and remote device 140, 142. This may be based on a comparison of time-date information associated with the changed properties with the existing time-date included in sync data 125. For example, the time-date information associated with the changed properties may be included in the remote data 135 and is a predetermined time value above the existing time-date information within the sync data 125. Alternatively, the establishing of the changed properties as low fidelity data may be determined based on the absence of time-date information for the properties.

Method 300 also includes an indication 320 that changed data originated from a low fidelity device. For example, local machine 105 can mark the properties as low fidelity data. Such marking may be in the form of a flag. Alternatively, or in conjunction, the marking may be metadata associated with existing time-date information corresponding to the properties included in sync data 125. The metadata may be a time-date value of a predetermined time above the existing time-date information. The marking may also be time-date information associated with when the remote device and the local machine last synchronized the properties.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 4:
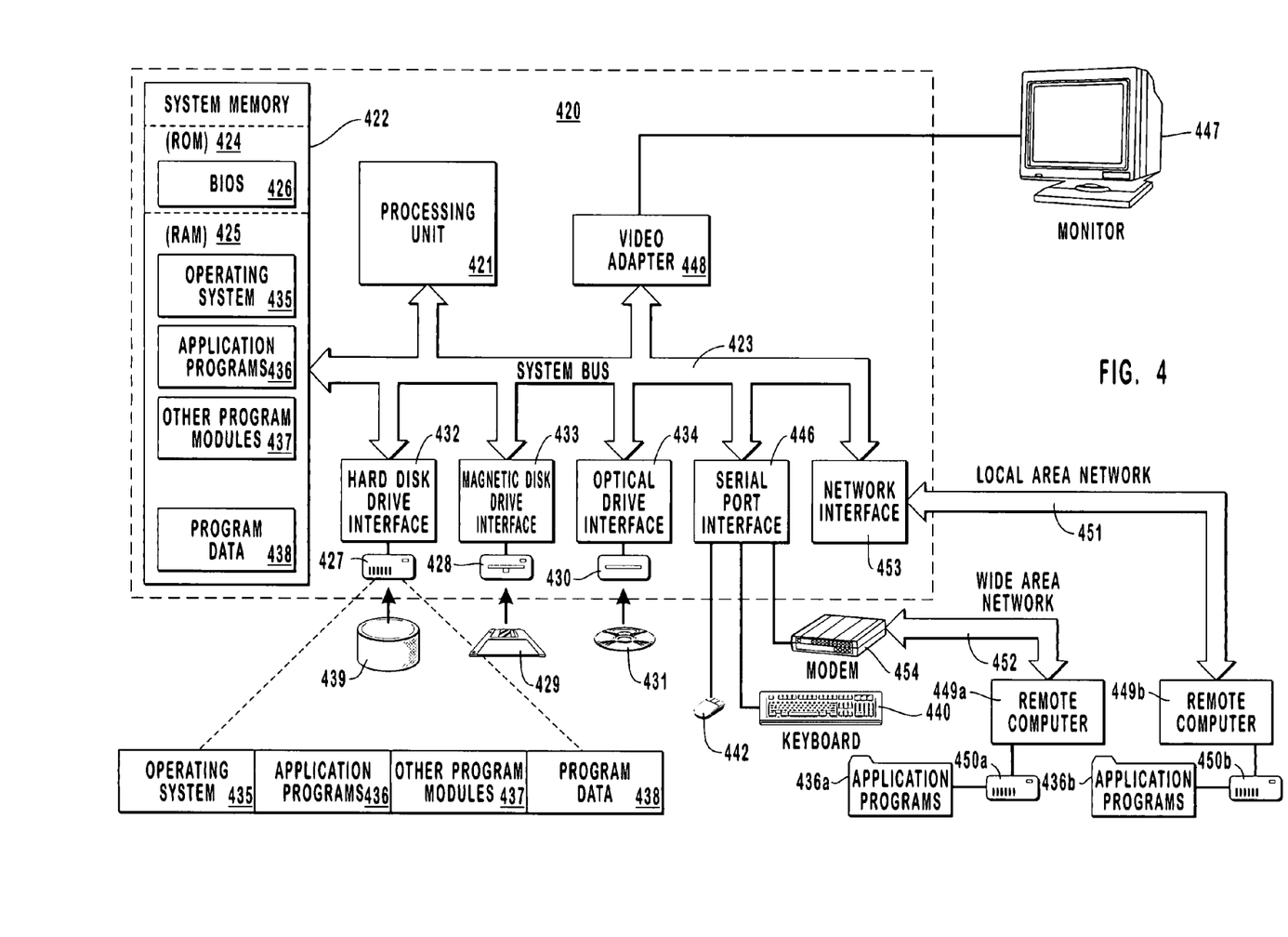
FIG. 4 illustrates an example system that provides a suitable operating environment for the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a distributed computer system capable of synchronizing data between devices, a method of detecting and marking data as low fidelity data for identifying any time-date information associated with the low fidelity data as potentially unreliable, the method comprising the acts of:
   initiating synchronization of data between the local machine and a remote device;
   determining that one or more properties of remote data are changed properties that need to be synchronized with corresponding properties of local data;
   establishing that the changed properties are low fidelity data in that it is not determinative when the one or more properties where changed; and
   upon synchronizing of the changed properties, indicating that the changed properties are low fidelity data.

2. The method of claim 1, wherein the indication is done by marking the one or more properties with a flag.

3. The method of claim 1, wherein the indication is metadata associated with existing time-date information corresponding to the one or more properties included in sync data, which is specific to the local machine and the remote device in that the sync data mirrors data that was last synchronized between the local machine and the remote device.

4. The method of claim 3, wherein the metadata is a time-date value of a predetermined time above the existing time-date information.

5. The method of claim 3, wherein the establishing of the changed data as low fidelity data is based on a comparison of time-date information associated with the changed properties with existing time-date information included in sync data, wherein the time-date information associated with the changed properties is included in the remote data and is a predetermined time value above the existing time-date information.

6. The method of claim 1, wherein the indication is time-date information associated with when the remote device and the local machine last synchronized the one or more properties.

7. The method of claim 1, wherein the establishing of the changed properties as low fidelity data is determined based on the absence of time-date information for the one or more properties.

8. In a distributed computer system capable of synchronizing data between devices, a computer program product for implementing a method of detecting and marking data as low fidelity data for identifying any time-date information associated with the low fidelity data as potentially unreliable, the computer program product comprising one or more computer readable media having stored thereon computer executable instructions that when executed by a process cause the distributed computing system to perform the following:
   initiate synchronization of data between the local machine and a remote device;
   determine that one or more properties of remote data are changed properties that need to be synchronized with corresponding properties of local data;
   establish that the changed properties are low fidelity data in that it is not determinative when the one or more properties where changed; and
   upon synchronizing of the changed properties, indicate that the changed properties are low fidelity data.

9. The computer program product of claim 8, wherein the indication is done by marking the one or more properties with a flag.

10. The computer program product of claim 8, wherein the indication is metadata associated with existing time-date information corresponding to the one or more properties included in sync data, which is specific to the local machine and the remote device in that the sync data mirrors data that was last synchronized between the local machine and the remote device.

11. The computer program product of claim 10, wherein the metadata is a time-date value of a predetermined time above the existing time-date information.

12. The computer program product of claim 10, wherein the establishing of the changed data as low fidelity data is based on a comparison of time-date information associated with the changed properties with existing time-date information included in sync data, wherein the time-date information associated with the changed properties is included in the remote data and is a predetermined time value above the existing time-date information.

13. The computer program product of claim 8, wherein the indication is time-date information associated with when the remote device and the local machine last synchronized the one or more properties.

14. The computer program product of claim 8, wherein the establishing of the changed properties as low fidelity data is determined based on the absence of time-date information for the one or more properties.

* * * * *